United States Patent
Bonardi et al.

(10) Patent No.: US 10,746,669 B2
(45) Date of Patent: Aug. 18, 2020

(54) MACHINE AND METHOD FOR INSPECTING THE CONFORMITY OF PRODUCTS

(71) Applicant: ANTARES VISION S.P.A., Brescia (IT)

(72) Inventors: Massimo Bonardi, Brescia (IT); Emidio Zorzella, Brescia (IT)

(73) Assignee: ANTARES VISION S.P.A., Brescia (IT)

( * ) Notice: Subject to any disclaimer, the term of this patent is extended or adjusted under 35 U.S.C. 154(b) by 177 days.

(21) Appl. No.: 15/747,030

(22) PCT Filed: Jul. 28, 2015

(86) PCT No.: PCT/EP2015/067299
§ 371 (c)(1),
(2) Date: Jan. 23, 2018

(87) PCT Pub. No.: WO2017/016597
PCT Pub. Date: Feb. 2, 2017

(65) Prior Publication Data
US 2019/0011377 A1    Jan. 10, 2019

(51) Int. Cl.
*G01N 21/95* (2006.01)
*G01B 11/245* (2006.01)

(52) U.S. Cl.
CPC ....... *G01N 21/9508* (2013.01); *G01B 11/245* (2013.01)

(58) Field of Classification Search
CPC ....... G01N 21/9508; G01N 21/88–958; G01B 11/245
See application file for complete search history.

(56) References Cited

U.S. PATENT DOCUMENTS 5,638,657 A    6/1997  Archer et al.
6,346,713 B1 *  2/2002  Van Valkenburg ........................
                                                       G01N 21/8901
                                                            250/228
(Continued)

FOREIGN PATENT DOCUMENTS

WO    2011007186 A2    1/2011

OTHER PUBLICATIONS

International Search Report dated Apr. 29, 2016 during the prosecution of International Application No. PCT/EP2015/067299.

*Primary Examiner* — Hina F Ayub
(74) *Attorney, Agent, or Firm* — Troutman Pepper Hamilton Sanders LLP

(57) ABSTRACT

An inspection machine inspecting the conformity of products comprises a first roller equipped with first housings positioning the products, a second roller parallel and opposite to the first roller equipped with second housings positioning the products, transfer means transferring the products into an overturned position from the first housings to the second housings, a first device checking the conformity of the products positioned in the first housings, a second device checking the conformity of the products positioned in the second housings, at least one of said first and second checking devices comprising an image acquisition system from a transit zone of the products and at least one first and one second lighting system respectively of the transit zone arranged and configured for the acquisition from the transit zone of a first and a second image respectively in each of which the products are positioned substantially at the same spatial coordinates.

10 Claims, 9 Drawing Sheets

(56) References Cited

U.S. PATENT DOCUMENTS

2002/0171825 A1* 11/2002 Krantz ............ G01N 21/95607
　　　　　　　　　　　　　　　　　　　356/237.1
2013/0022250 A1　　1/2013　Nygaard et al.

* cited by examiner

MACHINE AND METHOD FOR INSPECTING THE CONFORMITY OF PRODUCTS

CROSS-REFERENCE TO RELATED APPLICATIONS

This is a U.S. national phase application under 35 U.S.C. § 371 of International Patent Application No. PCT/EP2015/067299, filed Jul. 28, 2015. The entire contents of these applications are hereby incorporated by reference.

FIELD OF TECHNOLOGY

The present invention relates to a machine and a method for inspecting the conformity of products.

BACKGROUND

Inspection machines are known in the pharmaceutical and food fields, or in other sectors where it is necessary to identify various products not able to pass the quality test and move them away from the packaging line.

In such machines, through the use of video cameras, there is active control of some product characteristics, such as checking for integrity, the presence of surface impurities and the presence of typical production faults.

An inspection machine known on the market comprises a first roller equipped with first product positioning housings, means for loading the products into the first positioning housings, a first controlled depression compartment for retaining products in the first housings, a second roller parallel to and opposite the first roller and equipped with second product positioning housings, a second controlled depression compartment for retaining the products in the second housings, transfer means for transferring the products into the overturned position from the first housings to the second housings, a first device for checking the conformity of the products positioned in the first housings, a second device for checking the conformity of the products positioned in the second housings, and means for selecting the checked and conforming products.

SUMMARY

One of the main drawbacks complained of in a traditional inspection machine consists of the limited efficiency of detecting faults when they are of very different types from one another. For example, the control device, based on video cameras, may be more efficient in the detection of surface faults, such as breakages, chips and malformations, and less efficient in the detection of colour or impurity faults, or vice versa.

Sometimes, to improve the efficiency in detecting faults the productivity of the machine ends up being penalised, for example, if it is decided to reduce the rotation speed of the rollers to optimise the exposure time of products to the video cameras. In this case the productivity of the packaging line of products following the inspection machine in cascade is also penalised.

The technical task of the present invention is therefore to provide an inspection method and machine of the type described above that makes it possible to eliminate the cited technical drawbacks of the prior art.

Within the context of this technical task an object of the invention is to provide an inspection machine that is highly efficient in the detection of faults of different types on the products.

Another object of the invention is to provide a highly productive inspection machine.

Finally, an object of the invention is to provide an inspection machine with a simple construction and reliable operation.

The technical task, as well as these and other objects, according to the present invention, are reached by providing an inspection machine for inspecting the conformity of products comprising a first roller equipped with first housings for positioning the products, a second roller parallel and opposite to the first roller equipped with second housings for positioning the products, transfer means for transferring the products into an overturned position from the first housings to the second housings, a first device for checking the conformity of the products positioned in the first housings, a second device for checking the conformity of the products positioned in the second housings, characterised in that at least one of said first and second checking devices comprises an image acquisition system from a transit zone of the products and at least one first and one second lighting system respectively of the transit zone arranged and configured for the acquisition from the transit zone of a first and a second image respectively in each of which the products are positioned substantially at the same spatial coordinates.

In a preferred embodiment of the invention the first lighting system is arranged and configured for the emission of oblique light on the transit zone.

In a preferred embodiment of the invention the second lighting system is arranged and configured for the emission of incident light on the transit zone.

In a preferred embodiment of the invention the image acquisition system comprises at least one linear video camera.

In a preferred embodiment of the invention the image acquisition system comprises a plurality of linear video cameras having different pointing angles onto the transit zone.

In a preferred embodiment of the invention at least one linear video camera has decentred optics.

The present invention also discloses an inspection method for inspecting the conformity of products, characterised in that it transports the products on a roller, substantially illuminates a same transit zone of the products with a first and a second independent lighting system, wherein the lighting of said transit zone is piloted stroboscopically alternating the switching on of said first and second lighting system, and acquiring the image from the transit zone illuminated by said first and second lighting system.

In a preferred embodiment of the invention the first lighting system illuminates the transit zone with oblique light and the second lighting system illuminates the transit zone with incident light.

In a preferred embodiment of the invention the image from the transit zone itself is acquired with at least one linear video camera and the lines of the image thus acquired are separated so as to obtain a first image of the products illuminated by the first lighting system and a second image of the products illuminated by the second lighting system in each of which the products are substantially positioned at the same spatial coordinates.

Other characteristics of the present invention are also defined in other dependent claims.

BRIEF DESCRIPTION OF DRAWINGS

Further characteristics and advantages of the invention will more fully emerge from the description of a preferred but not exclusive embodiment of the inspection machine according to the invention, illustrated by way of non-limiting example in the accompanying figures of the drawings, in which.

DETAILED DESCRIPTION

Figure 1:
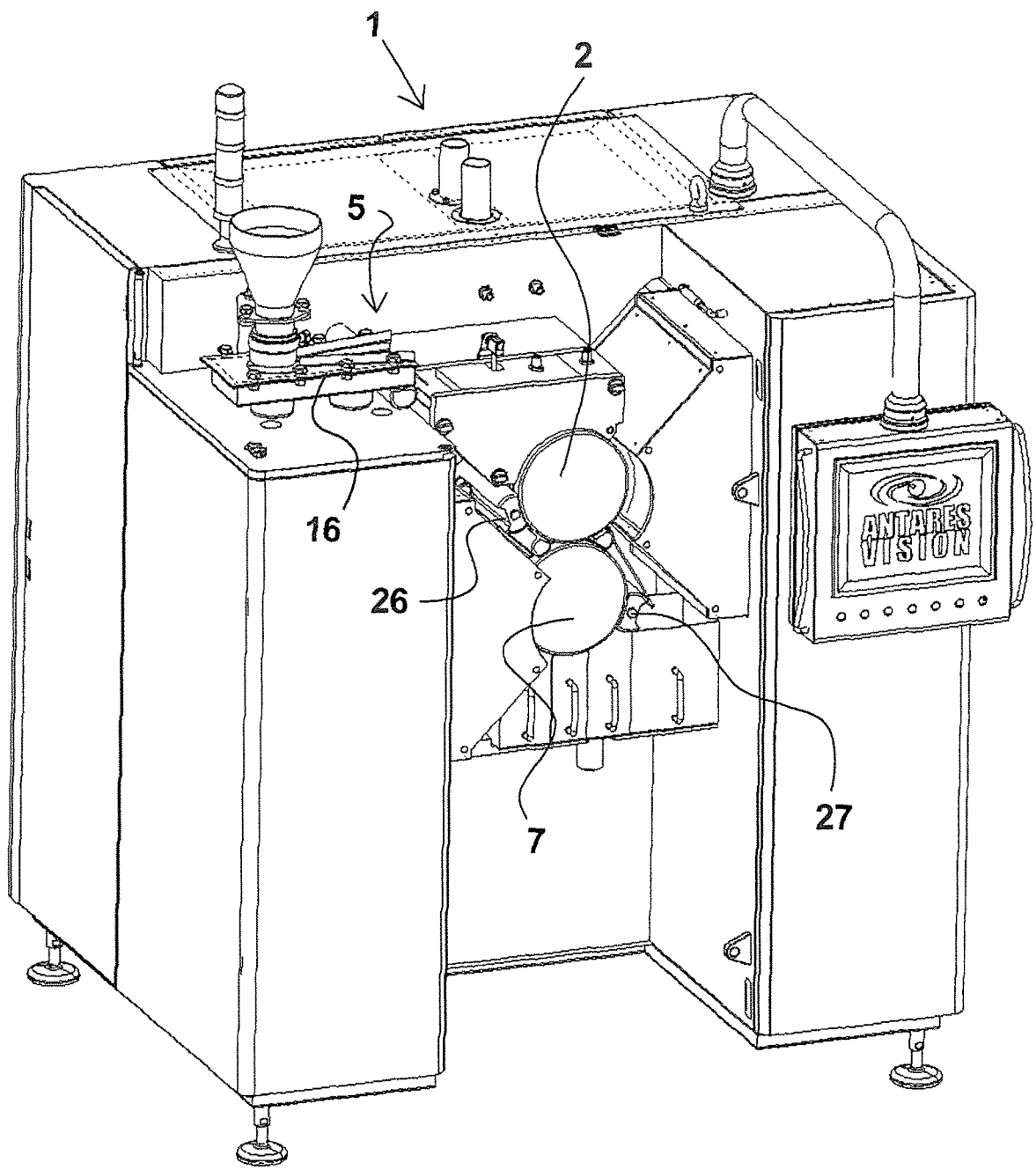
FIGS. 1 and 2 show an axonometric view of the inspection machine.
Figure 2:
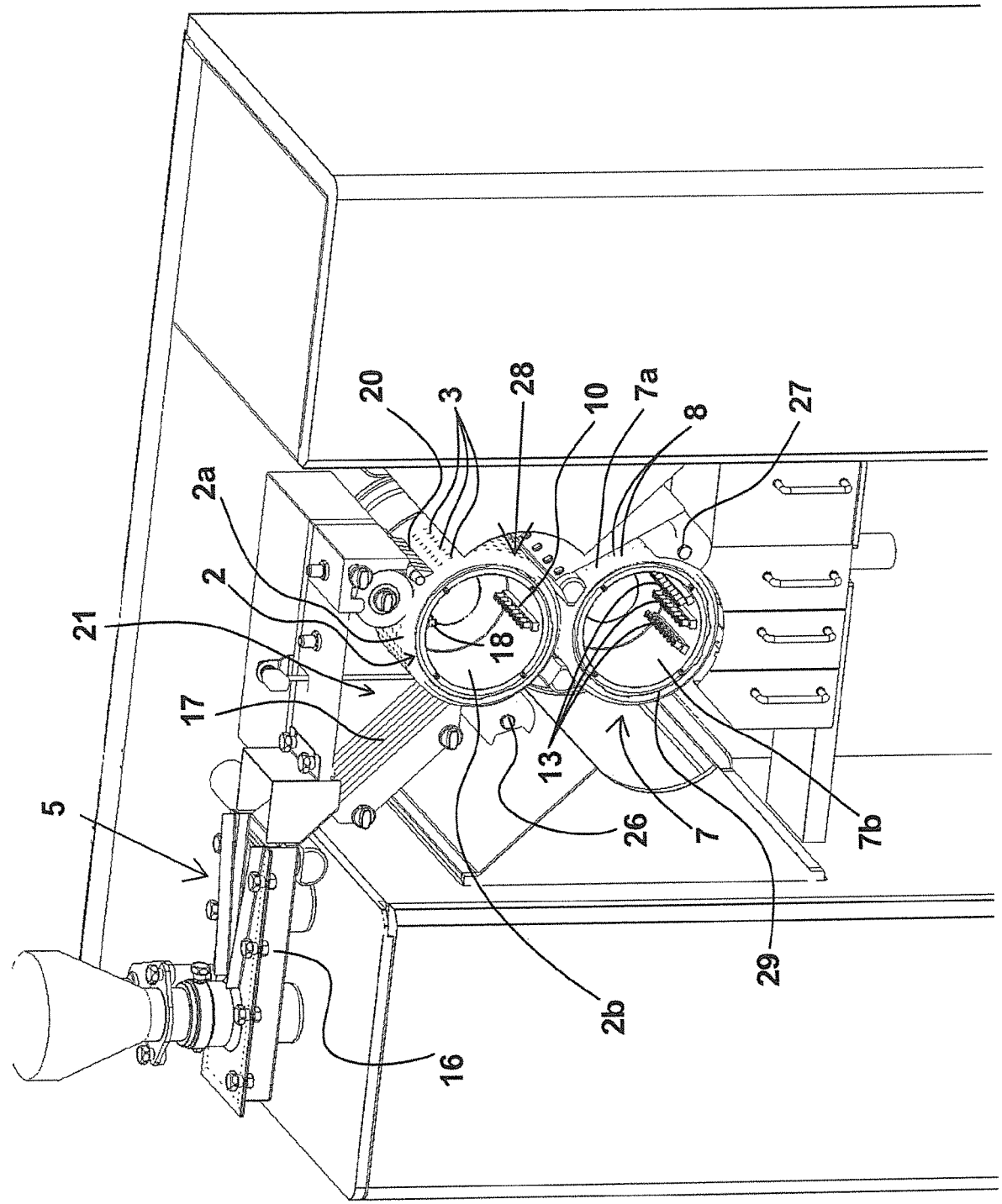
Figure 3:
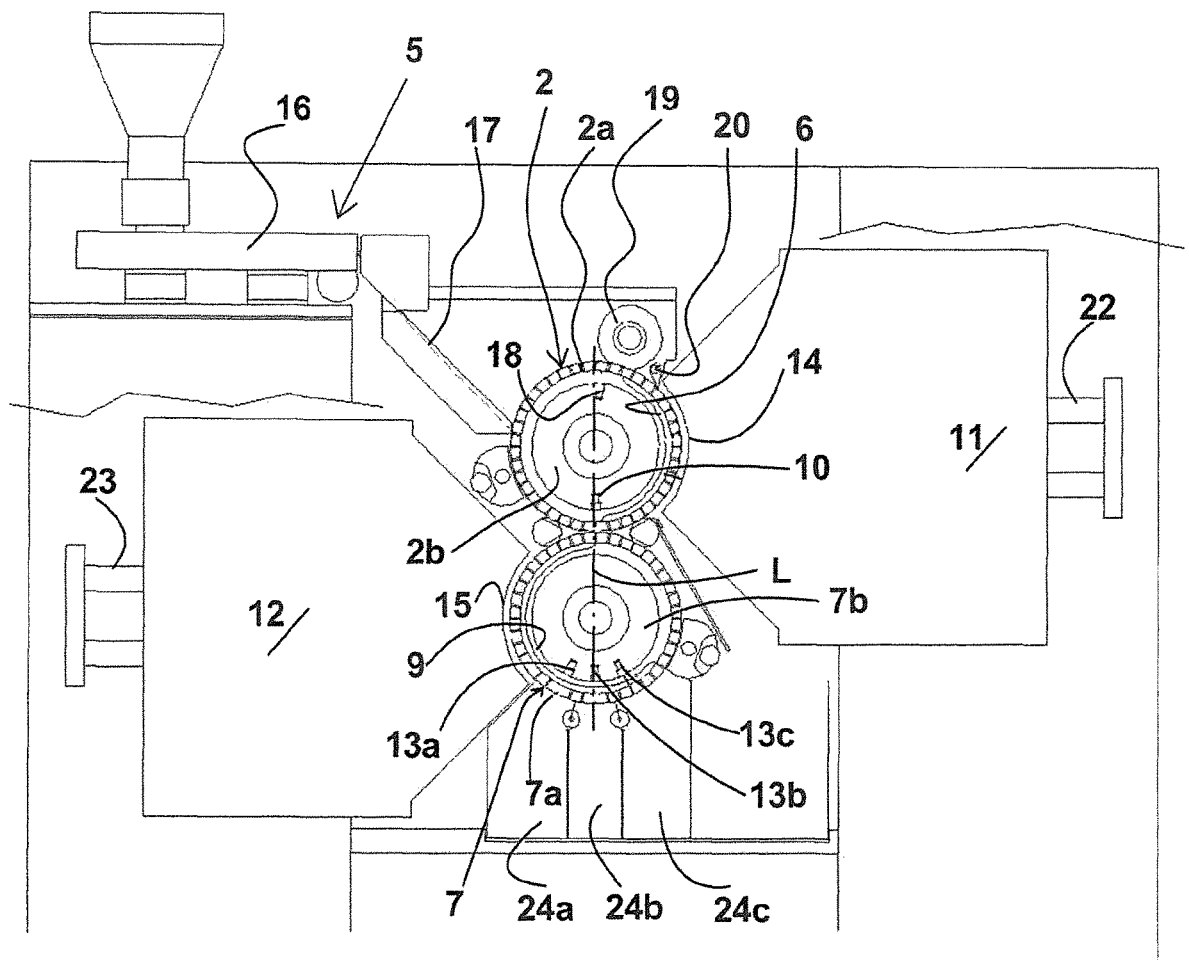
FIG. 3 schematically shows a raised lateral view of the inspection machine of FIGS. 1 and 2.
Figure 4:
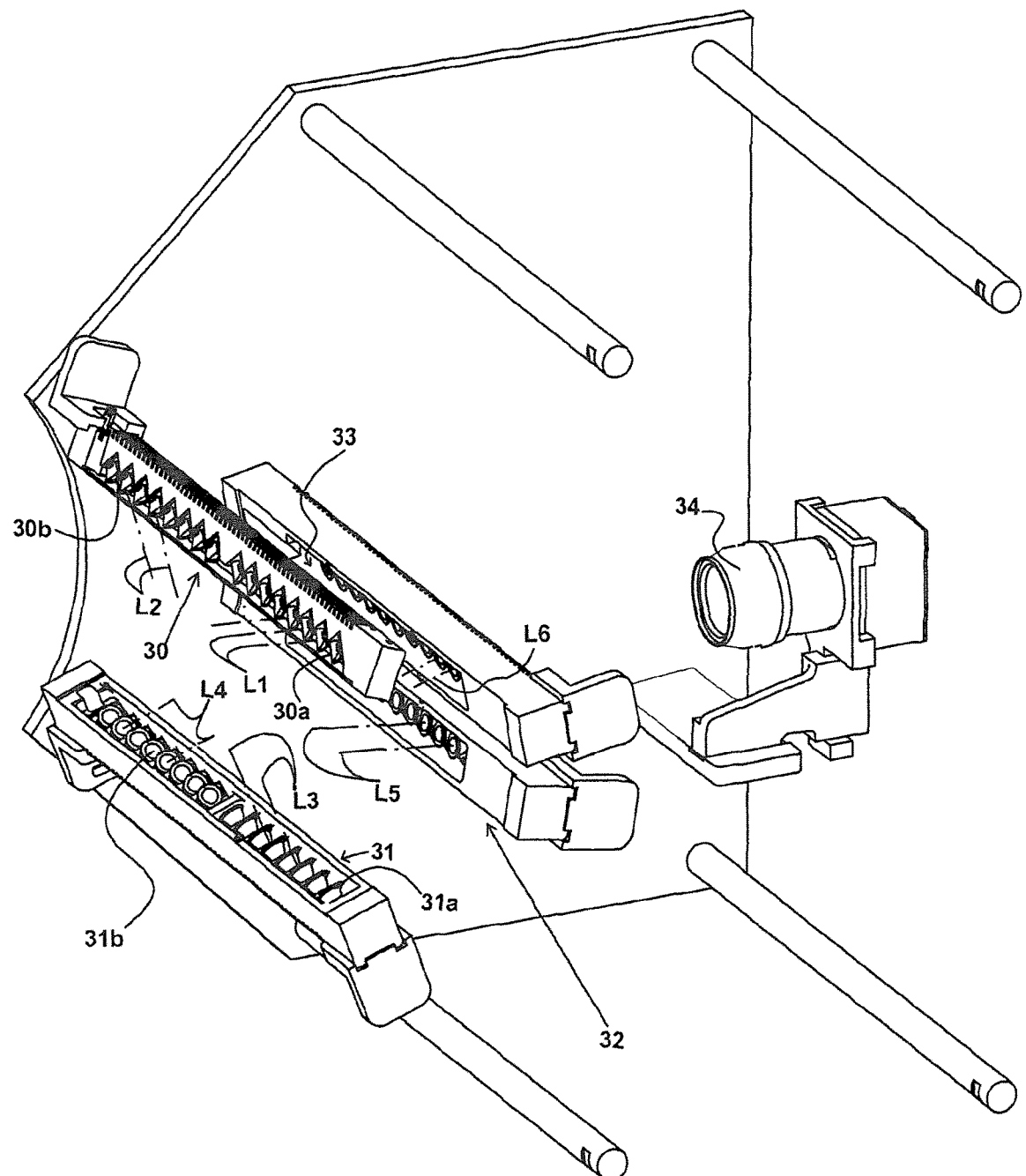
FIG. 4 schematically shows an axonometric view of the two lighting systems and the image acquisition system of the first control device.
Figure 5:
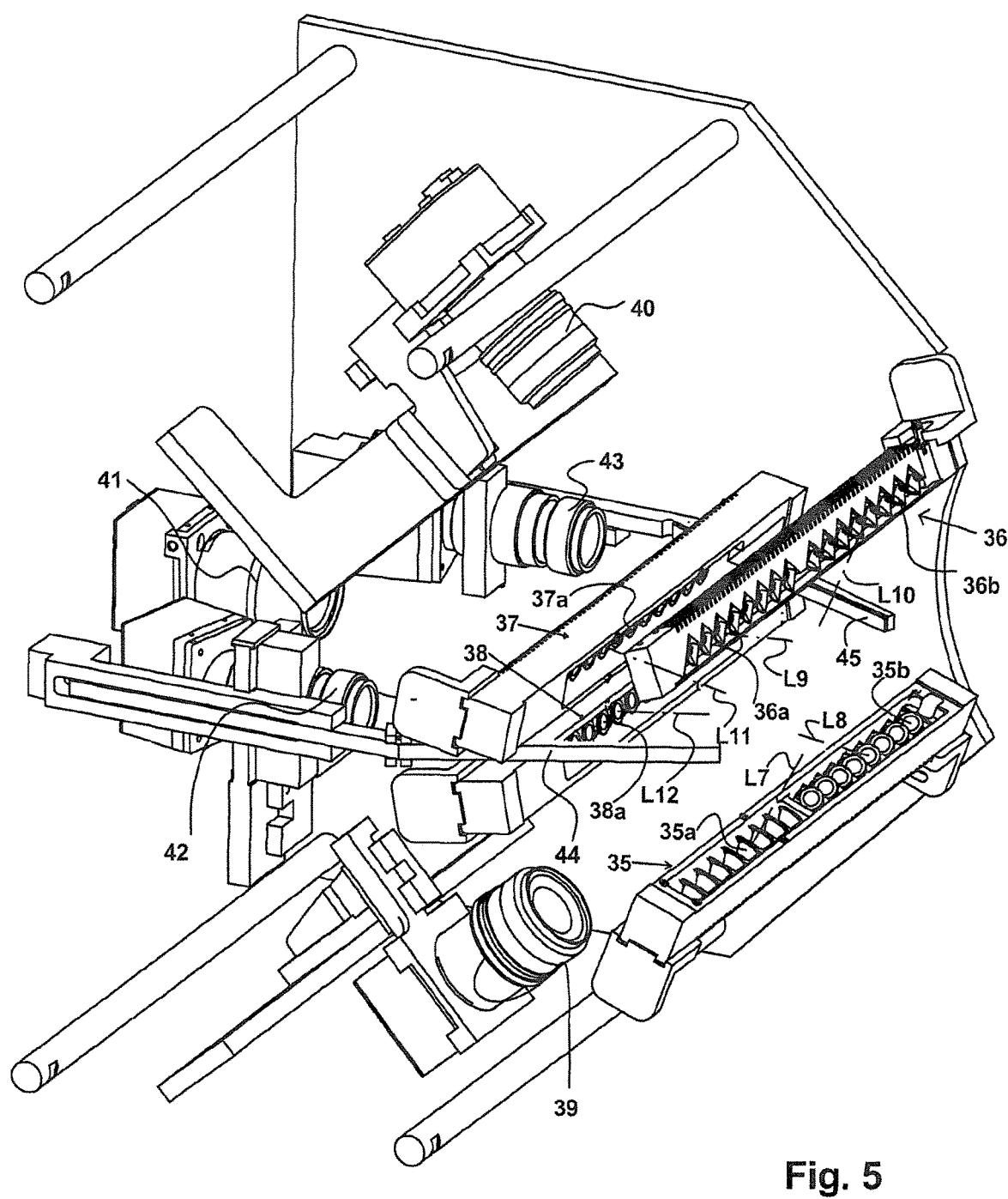
FIG. 5 schematically shows an axonometric view of the two lighting systems and the image acquisition system of the second control device.
Figure 6:
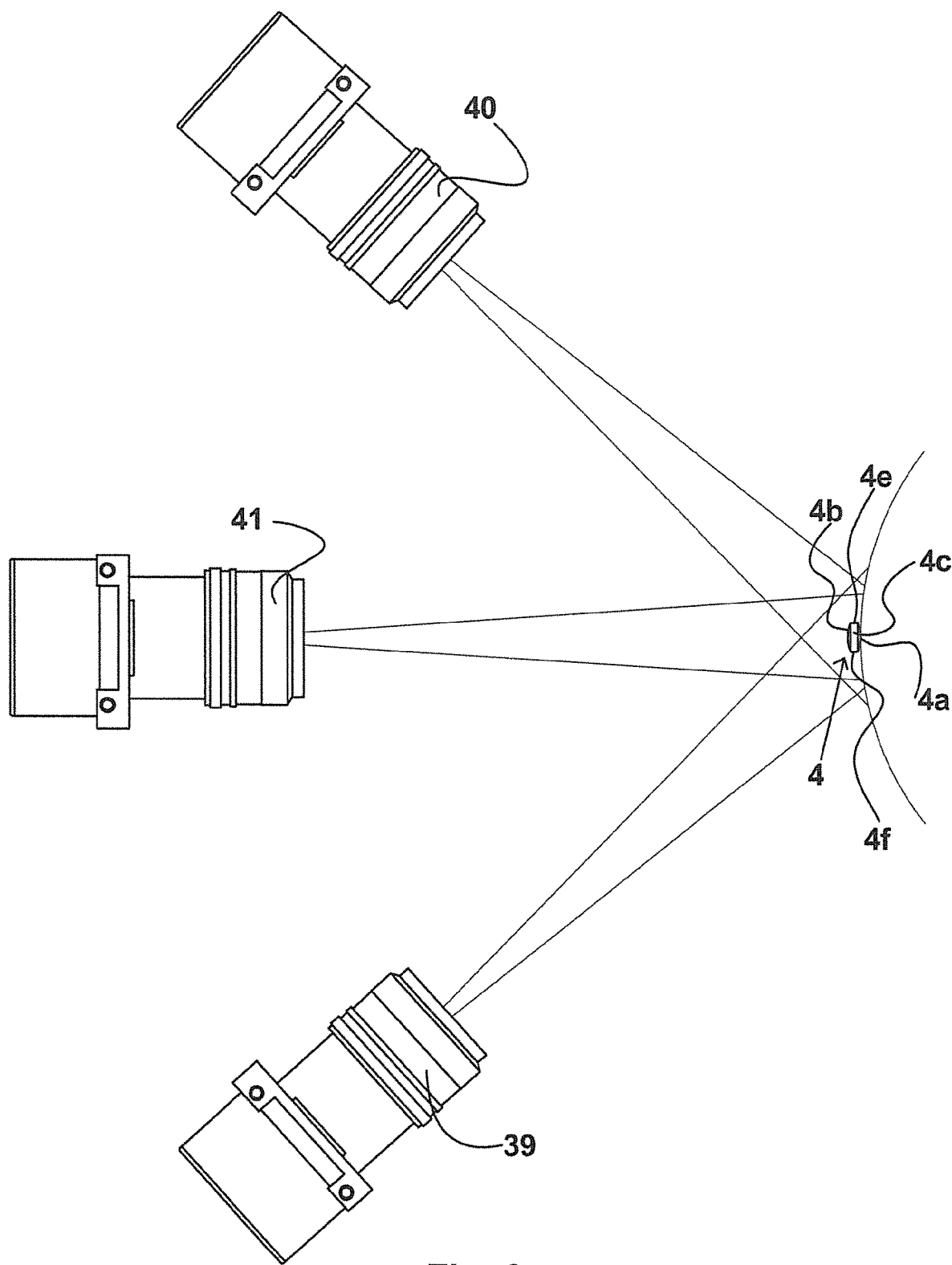
FIG. 6 schematically shows the position of the three linear video cameras with centred optics envisaged in the second control device.
Figure 7:
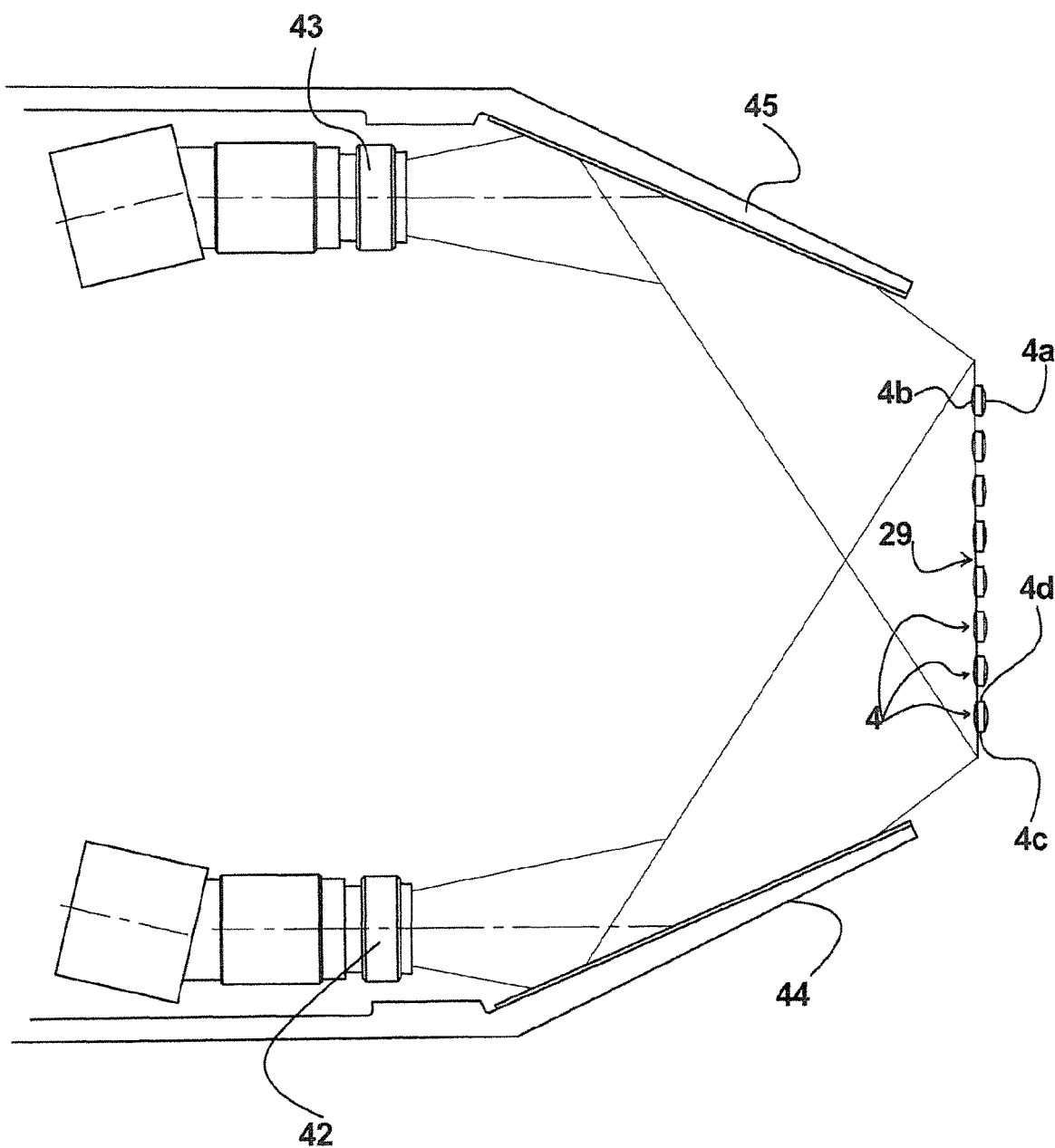
FIG. 7 schematically shows the position of the two linear video cameras with decentred optics envisaged in the second control device.

With reference to the figures mentioned, an inspection machine for inspecting the conformity of products is shown indicated overall with the reference number 1.
The machine 1 comprises a control unit which with the aid of an encoder coordinates the various activities.

The machine 1 comprises a first roller 2 equipped with first product 4 positioning housings 3, means 5 for loading the products 4 into the first positioning housings 3, a first controlled depression compartment 6 for retaining products 4 in the first housings 3, a second roller 7 parallel to and opposite the first roller 2 and equipped with second product 4 positioning housings 8, a second controlled depression compartment 9 for retaining the products 4 in the second housings 8, transfer means 10 for transferring the products 4 into the overturned position from the first housings 3 to the second housings 8, a first device 11 for checking the conformity of the products 4 positioned in the first housings 3, a second device 12 for checking the conformity of the products 4 positioned in the second housings 8, and means 13 for selecting the checked and conforming products 4.

The first roller 2 has a rotating hollow external cylindrical part 2a supported coaxially by a fixed hollow internal cylindrical part 2b.

The second roller 7 has a rotating hollow external cylindrical part 7a supported coaxially by a fixed hollow internal cylindrical part 7b.
The first positioning housings 3, present on the rotating part 2a of the first roller 2, are arranged in angularly equidistant rows that extend along axial generatrices of the rotating part 2a of the first roller 2.

The second positioning housings 8, present on the rotating part 7a of the second roller 7, are arranged in angularly equidistant rows that extend along the axial generatrices of the rotating part 7a of the second roller 7.

The first positioning housings 3 are preferably different in conformation from the second positioning housings 8 to leave different surfaces of the products 4 positioned in them exposed to the light.

In the specific case in question the first housings 3 are conformed so as to leave only one first base 4a of the products 4 exposed to the light, while the second positioning housings 8 are conformed to leave the four lateral faces 4c, 4d, 4e, 4f and the second base 4b of the products 4 exposed to the light.

In particular, the first positioning housings 3 are formed by hollows into which the products 4 are completely introduced, while the second positioning housings are formed by trays that support the products 4 in a cantilever fashion.

The loading means 5 comprise in cascade a vibrating loader 16 and a slide 17 for channelling the products into the first positioning housings 3.

At the first roller 2, in proximity to the loading zone 21, there is an associated pneumatic prealignment system 18 of the products 4 in the first positioning housings 3, a rotating organ 19 for removing the excess products 4 that are taken back to the loading zone 21, and a mobile feeler 20 or other suitable organ for precisely positioning the previously aligned products 4 in the first positioning housings 3.

The first controlled depression compartment 6, connected to relevant means for creating a depression within it, is defined by the outer surface of the fixed part 2b of the first roller 2 and extends fully or prevalently from one side of the plane L passing through the axes of the first and second roller 2, 7. This first controlled depression compartment 6 in particular subtends an angle slightly less than 180°. The first housings 3 on the bottom have calibrated through openings in the wall thickness of the rotating part 2a of the first roller 2 to establish fluid communication with the first controlled depression compartment 6 when they transit in front of it.

The first control device 11 faces the fixed part 2b of the first roller 2 where the first controlled depression compartment 6 is provided. In particular, the first control device 11 is contained within a box-like body that faces the first roller 2 with an arched transparent wall 14 coaxial to the first roller 2 itself.

The first control device 11 is supported by a slide 22 translatably radially with respect to the first roller 2 to allow the replacement and maintenance of the latter.

The second controlled depression compartment 9, connected to relevant means for creating a depression within it, is defined by the outer surface of the fixed part 7b of the second roller 7 and extends fully or prevalently, with respect to the first controlled depression compartment 6, from the other side of the plane L passing through the axes of the first and second roller 2, 7. This second controlled depression compartment 9 in particular subtends an angle slightly less than 180°. The second housings 8 on the bottom have calibrated through openings in the wall thickness of the rotating part 7a of the second roller 7 to establish fluid communication with the second controlled depression compartment 9 when they transit in front of it.

The second control device 12 faces the fixed part 7b of the second roller 7 where the second controlled depression compartment 9 is provided. In particular, the second control device 12 is contained within a box-like body that faces the second roller 7 with an arched transparent wall 15 coaxial to the second roller 7 itself.

The second control device 12 is supported by a slide 23 translatably radially with respect to the second roller 7 to allow the replacement and maintenance of the latter.

The first roller 2 comprises an aspirator 26 for cleaning the first housings 3, in a diametrically opposite position to the first controlled depression compartment 6, hence in a zone of the first roller 2 where the first housings 3 are free.

The second roller 7 comprises an aspirator 27 for cleaning the second housings 8, in a diametrically opposite position to the second controlled depression compartment 9, hence in a zone of the second roller 7 where the second housings 8 are free.

The means 10 for transferring the products 4 into an overturned position from the first housings 3 to the second housings 8 comprise controlled overpressure means supported by the fixed part 2b of the first roller 2. Such controlled overpressure means are adapted to supply a flow of fluid through calibrated through openings in the wall thickness of the fixed part 2b provided at the transfer zone. The flow of fluid can exert a thrust on the products 4 contained in the first housings 3 that are aligned with such openings provided in the fixed part 2b, to bring them into an overturned position in the second housings 8 that are opposite these first housings 3.

The means 13 for selecting checked and conforming products 4 comprise a plurality of controlled overpressure means, for example three means 13a, 13b, 13c supported in an angularly staggered position from the fixed part 7b of the second roller 7. Such controlled overpressure means 13a, 13b, 13c are adapted to supply a flow of fluid through calibrated through openings in the wall thickness of the fixed part 7b provided at an unloading zone of the products 4 from the second roller 7.

The controlled overpressure means 13a, 13b, 13c act to convey the products into corresponding collectors 24a, 24b, 24c according to the outcome of the quality control, for example, according to whether they are conforming, non-conforming or not inspected.

Advantageously, at least one, and in particular, each control device 11 and respectively 12 comprises at least a first and a second independent lighting system arranged and configured to substantially illuminate a same transit zone 28 and respectively 29 of the products 4, and an image acquisition system of the transit zone 28 and respectively 29.

The reference transit zone 28 and respectively 29 is defined by the surface brushed by an axial generatrix of the rotating part 2a of the roller 2 and respectively by the rotating part 7a of the roller 7 during the rotation of the roller 2 and respectively 7 by a first and a second angular reference position.

The first lighting system is arranged and configured for the emission of oblique light on the transit zone 28, 29.

The second lighting system is arranged and configured for the emission of incident light on the transit zone 28, 29.

We initially refer to the first control device 11.

The first lighting system comprises a first string 30 of LEDs 30a, 30b spatially aligned parallel to the axis of the first roller 2.

The LEDs 30a, 30b are split into two groups according to the emission direction L1, L2. The LEDs 30a, 30b are in particular configured for emission in two emission directions L1, L2 coplanar and orthogonal to one another.

The first lighting system also comprises a second string 31 of LEDs 31a, 31b spatially aligned parallel to the axis of the first roller 2.

The LEDs 31a, 31b are split into two groups according to the emission direction L3, L4. The LEDs 31a, 31b are in particular configured for emission in two emission directions L3, L4 coplanar and orthogonal to one another, and orthogonal in turn to the two emission directions L1, L2 of the LEDs 30a, 30b of the first string 30 of LEDs.

The number of LEDs in each string 30, 31 is equal to twice the number of first housings 3 in each row of first housings 3.

The first lighting system associates with each first housing 3 in the transit zone 28 a corresponding set of LEDs 30a, 30b, 31a, 31b dedicated to its oblique lighting from four different angles.

The second lighting system comprises a first string 32 of LEDs 32a spatially aligned parallel to the axis of the first roller 2 and configured for emission in a single emission direction L5.

The second lighting system also comprises a second string 33 of LEDs 33a spatially aligned parallel to the axis of the first roller 2 and configured for emission in a single emission direction L6 inclined with respect to the emission direction L5 of the first string 32 of LEDs.

The number of LEDs 32a, 33a, in each string 32, 33 is equal to the number of first housings 3 in each row of first housings 3.

The second lighting system associates with each first housing 3 in the transit zone 28 a corresponding set of LEDs 32a, 33a, dedicated to its incident lighting from two different angles. The image acquisition system comprises in the specific case a single linear video camera 34 sufficient for acquiring the image of the products 4 whose base 4a only is substantially exposed to the light.

We now refer to the second control device 12.

The first lighting system is the same as that described for the first control device 11.

It comprises a first string 36 of LEDs 36a, 36b spatially aligned parallel to the axis of the second roller 7.

The LEDs 36a, 36b are split into two groups according to the emission direction L9, L10. The LEDs 36a, 36b are in particular configured for emission in two emission directions L9, L10 coplanar and orthogonal to one another.

The first lighting system also comprises a second string 35 of LEDs 35a, 35b spatially aligned parallel to the axis of the second roller 7.

The LEDs 35a, 35b are split into two groups according to the emission direction L7, L8. The LEDs 35a, 35b are in particular configured for emission in two emission directions L7, L8 coplanar and orthogonal to one another, and orthogonal in turn to the two emission directions L9, L10 of the LEDs 36a, 35b of the first string 36 of LEDs.

The number of LEDs in each string 35, 36 is equal to twice the number of second housings 8 in each row of second housings 8.

The first lighting system associates with each second housing 8 in the transit zone 29 a corresponding set of LEDs 35a, 35b, 36a, 36b dedicated to its oblique lighting from four different angles.

The second lighting system is the same as that described for the first control device 11.

It comprises a first string 37 of LEDs 37a spatially aligned parallel to the axis of the second roller 3 and configured for emission in a single emission direction L11.

The second lighting system also comprises a second string 38 of LEDs 38a spatially aligned parallel to the axis of the second roller 3 and configured for emission in a single emission direction L12 inclined with respect to the emission direction L11 of the first string 37 of LEDs.

The number of LEDs 37a, 38a, in each string 37, 38 is equal to the number of second housings 8 in each row of second housings 8.

The second lighting system associates with each second housing 8 in the transit zone 29 a corresponding pair of LEDs 37a, 38a, dedicated to its incident lighting from two different angles.

The image acquisition system comprises in the specific case five linear video cameras 39, 40, 41, 42, 43, for acquiring the image of the products 4 whose second base 4b and four lateral sides 4c, 4d, 4e, 4f are substantially exposed to the light.

The linear video cameras 39, 40, 41, 42, 43 have different pointing angles onto the transit zone 29 and in particular the video camera 41 is pointing onto the second base 4b of products 4 transiting in the transit zone 29, the video camera 39 is pointing onto the side face 4f of the products 4 transiting in the transit zone 29, the video camera 40 is pointing onto the side face 4e of the products 4 transiting in the transit zone 29, the video camera 42 is pointing onto the side face 4c of the products 4 transiting in the transit zone 29, and the video camera 43 is pointing onto the side face 4d of the products 4 transiting in the transit zone 29.

In order to limit the transversal dimensions of the second control device 12 advantageously the video cameras 42 and 43 have decentred optics so as to acquire from the transit zone 29 the image reflected by relevant reflecting mirrors 44, 45.

The inspection method of the conformity of products 4 envisages illuminating the same transit zone 28 and respectively 29 of the products 4 with the first and the second independent lighting system of the first control device 11 and respectively the second control device 12.

The lighting of the transit zone 28, 29 is piloted stroboscopically by alternating switching on the first and the second lighting system.

The inspection method therefore envisages acquiring images from the transit zone 28, 29 both when it is illuminated with oblique light from the first lighting system and when it is lit with incident light from the second lighting system.

The images from the transit zone 28 are acquired with the linear video camera 34 while those from the transit zone 29 are acquired with the linear video cameras 39, 40, 41, 42, 43. The lines of the image acquired are separated so as to obtain a first image of the products 4 illuminated by the first lighting system and a second image of the products 4 illuminated by the second lighting system in each of which the products 4 are substantially positioned in the same spatial coordinates.

Figure 8A:
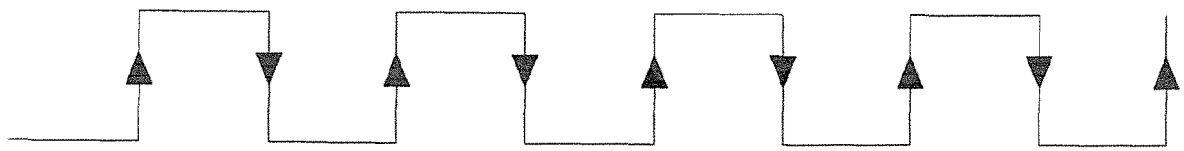
FIG. 8a shows the signal of the encoder used for timing the acquisitions of the optical acquisition system and of the two lighting systems in each control device.
Figure 8B:
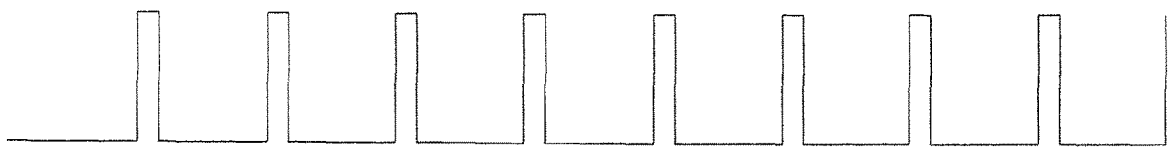
FIG. 8b shows the acquisition control pulses for the optical acquisition system.
Figure 8C:
FIG. 8c shows the acquisition control pulses for the first lighting system.
Figure 8D:
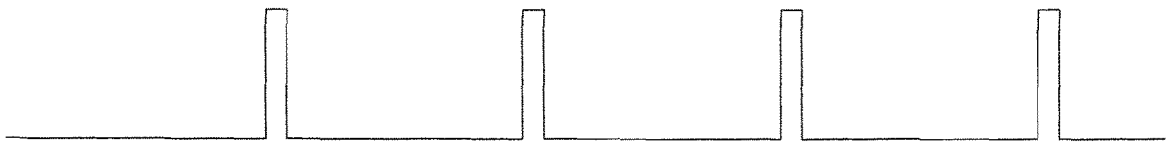
FIG. 8d shows the acquisition control pulses for the second lighting system.
Figure 9C:
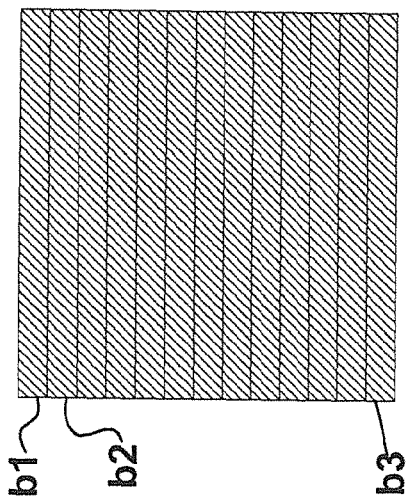
FIG. 9c shows the reconstruction of the image with the lines acquired with incident light active.
Figure 9B:
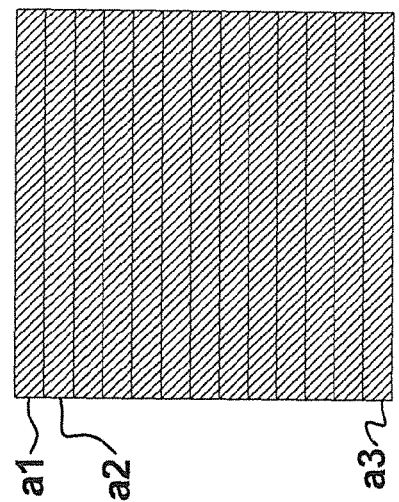
FIG. 9b shows the reconstruction of the image with the lines acquired with oblique light active.
Figure 9A:
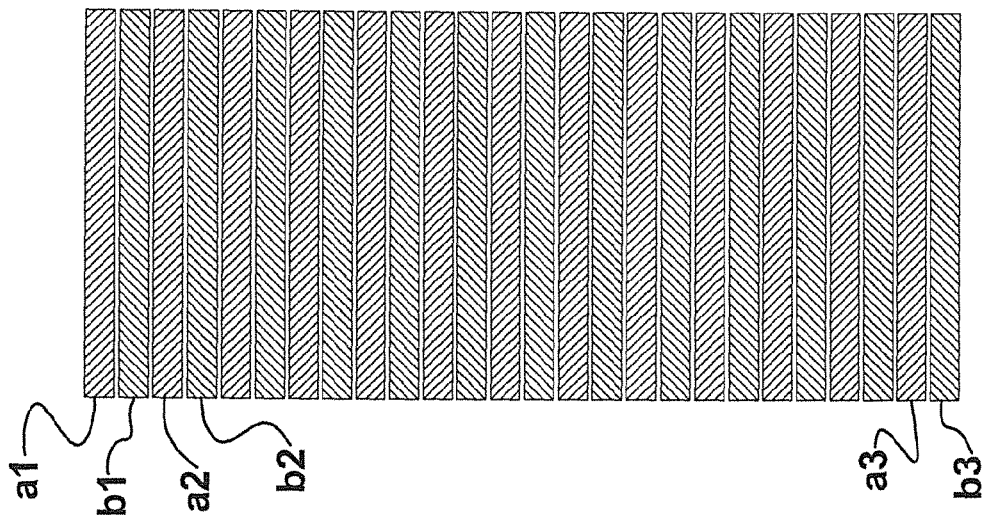
FIG. 9a shows the sequence of lines acquired overall with oblique and incident light alternatively active.

The image acquisition process, with reference to the first control device, is schematically illustrated in FIGS. 8a to 8d and 9a to 9c and is substantially as follows.

The video camera 34 points onto the transit zone 28.

The first roller 2 rotates at a constant prefixed speed.

The encoder generates equally spaced electric pulses and at the rising front of the electric pulse the control unit generates both an acquisition activation control pulse for the linear video camera 34 and a light emission control pulse for the first lighting system, while at the falling front of the electric pulse the control unit generates both an acquisition activation control pulse for the linear video camera 34 and a light emission control pulse for the second lighting system. Naturally, the control unit generates a control pulse for interrupting the emission of light for the first lighting system before or at the same time as the light emission control pulse for the second lighting system and vice versa.

The lines $a_1, a_2 \ldots a_n$ acquired by the linear video camera 34 when the transit zone 28 is illuminated by the first lighting system alternate with the lines $b_1, b_2 \ldots b_n$ acquired by the linear video camera 34 when the transit zone 28 is illuminated by the second lighting system. Subsequently, through relevant software, the control unit reconstructs the first image of the products 4 illuminated by the first lighting system and the second image of the products 4 illuminated by the second lighting system by separating the lines $a_1, a_2 \ldots a_n$ from the lines $a_1, a_2 \ldots a_n$ and stacking the lines $a_1, a_2 \ldots a_n$ according to the same order of acquisition and the lines $b_1, b_2 \ldots b_n$ according to the same order of acquisition.

Advantageously, the acquisition system acquires from the transit zone 28 a first and respectively a second image in each of which the products 4 are positioned substantially at the same spatial coordinates.

In this way it is possible to correlate the two images acquired in two different lighting conditions to highlight faults that may not have easily emerged from the examination of just one of the images. For example, lighting with oblique light is more suitable for the identification of surface faults such as breakages, chips and malformations, while lighting with incident light is more suitable for identifying colour or impurity faults.

The image acquisition process, with reference to the second control device, will not be repeated since it is exactly the same as what has just been described. It should be noted that in this case the video cameras 39, 40, 41, 42, 43 are pointing fixed onto the transit zone 29 and the second roller 7 is synchronised with the first roller 2 and, having the same diameter, rotates at the same angular speed but in the opposite direction.

The machine and method for inspecting the conformity of products thus conceived are susceptible to numerous modifications and variants, all of which falling within the scope of the inventive concept. Moreover, all details may be replaced with other technically equivalent elements.

The materials used, as well as the dimensions, may in practice be of any type according to requirements and the state of the art.

The invention claimed is:

1. An inspection machine inspecting the conformity of products comprising:
    a first roller equipped with first housings positioning the products,
    a second roller parallel and opposite to the first roller equipped with second housings positioning the products,
    a transfer unit comprising a plurality of protrusions, the transfer unit positioned within the first roller at an interior surface of the first roller and transferring the products into an overturned position from the first housings to the second housings,
    a first device checking the conformity of the products positioned in the first housings,
    a second device checking the conformity of the products positioned in the second housings,
    wherein in that at least one of said first and second checking devices comprises:
        an image acquisition system from a transit zone of the products, and
        at least one first and one second lighting system respectively of the transit zone arranged and configured for the acquisition from the transit zone of a first and a second image respectively in each of which the products are positioned substantially at the same spatial coordinates, wherein:

said first lighting system comprises at least one first string of spatially aligned LEDs parallel to the axis of the roller and configured for an emission in two emission directions that are coplanar and orthogonal to one another, and said first lighting system comprises at least one second string of spatially aligned LEDs parallel to the axis of the roller and configured for an emission in two emission directions that are coplanar and orthogonal to one another, and orthogonal in turn to the two emission directions of the first string of LEDs.

2. The inspection machine according to claim 1, wherein said first lighting system is arranged and configured for emitting oblique light onto said transit zone.

3. The inspection machine according to claim 1, wherein said second lighting system is arranged and configured for emitting incident light onto said transit zone.

4. The inspection machine according to claim 1, further comprising a control unit configured to pilot the selective switching on of said first or second lighting system.

5. The inspection machine according to claim 4, wherein said control unit is configured to pilot the lighting of said transit zone stroboscopically by alternating the switching on of said first and second lighting system.

6. The inspection machine according to claim 1, wherein said image acquisition system comprises at least one linear video camera.

7. The inspection machine according claim 1, wherein said second lighting system comprises at least one first string of spatially aligned LEDs parallel to the axis of the roller and configured for an emission in a single emission direction.

8. The inspection machine according to claim 7, wherein said second lighting system comprises a second string of LEDs spatially aligned parallel to the axis of the roller and configured for the emission in a single emission direction which is inclined with respect to the emission direction of the first string of LEDs of the second lighting system.

9. The inspection machine according to claim 1, wherein said image acquisition system comprises a plurality of linear video cameras having different pointing angles onto said transit zone.

10. The inspection machine according to claim 9, wherein the at least one linear video camera has decentered optics.

* * * * *